US009359659B2

(12) United States Patent
Fujita et al.

(10) Patent No.: US 9,359,659 B2
(45) Date of Patent: Jun. 7, 2016

(54) METHOD FOR RECOVERING VALUABLE MATERIAL FROM LITHIUM-ION SECONDARY BATTERY, AND RECOVERED MATERIAL CONTAINING VALUABLE MATERIAL

(71) Applicant: DOWA ECO-SYSTEM Co., Ltd., Chiyoda-ku, Tokyo (JP)

(72) Inventors: Koji Fujita, Tokyo (JP); Satoshi Kawakami, Tokyo (JP); Yoshihiro Honma, Tokyo (JP); Ryoei Watanabe, Tokyo (JP)

(73) Assignee: DOWA ECO-SYSTEM Co., Ltd., Tokyo (JP)

( * ) Notice: Subject to any disclaimer, the term of this patent is extended or adjusted under 35 U.S.C. 154(b) by 402 days.

(21) Appl. No.: 13/927,428

(22) Filed: Jun. 26, 2013

(65) Prior Publication Data

US 2013/0287621 A1    Oct. 31, 2013

Related U.S. Application Data

(63) Continuation of application No. PCT/JP2011/078153, filed on Dec. 6, 2011.

(30) Foreign Application Priority Data

Dec. 27, 2010 (JP) .................................. 2010-291012

(51) Int. Cl.
| | | |
|---|---|---|
| *C22C 19/07* | (2006.01) | |
| *C22B 7/00* | (2006.01) | |
| *C22B 3/00* | (2006.01) | |
| *H01M 10/54* | (2006.01) | |
| *C22B 23/00* | (2006.01) | |
| *H01M 10/0525* | (2010.01) | |

(52) U.S. Cl.
CPC ................ *C22C 19/07* (2013.01); *C22B 7/007* (2013.01); *C22B 23/005* (2013.01); *C22B 23/04* (2013.01); *C22B 23/0407* (2013.01); *H01M 10/54* (2013.01); *H01M 10/0525* (2013.01); *Y02P 10/234* (2015.11); *Y02T 10/7011* (2013.01); *Y02W 30/84* (2015.05)

(58) Field of Classification Search
CPC .. H01M 10/54; H01M 10/0525; C22C 19/07; C22B 7/007
USPC ........................................................ 148/408
See application file for complete search history.

(56) References Cited

U.S. PATENT DOCUMENTS

| | | | |
|---|---|---|---|
| 6,110,433 A | | 8/2000 | Kleinsorgen et al. |
| 2009/0314134 A1* | | 12/2009 | Iida ........................ C22B 7/001 75/10.67 |

FOREIGN PATENT DOCUMENTS

| | | |
|---|---|---|
| JP | 06346160 A | 12/1994 |
| JP | 7-207349 | 8/1995 |
| JP | 7-245126 | 9/1995 |

(Continued)

*Primary Examiner* — Weiping Zhu
(74) *Attorney, Agent, or Firm* — Carmody Torrance Sandak & Hennessey LLP

(57) ABSTRACT

A method for recovering a valuable material from a lithium-ion secondary battery, the method contains: roasting a lithium-ion secondary battery containing a valuable material in a metal battery case thereof to obtain a roasted material; stirring the roasted material with liquid to separate contents containing the valuable material from the inside of the metal battery case; and sorting the contents separated by the separation and the metal battery case to obtain a recovered material containing the valuable material.

6 Claims, 1 Drawing Sheet

30mm

(56) References Cited

FOREIGN PATENT DOCUMENTS

| JP | 10-510879 | 10/1998 |
| JP | 2004-342524 | 12/2004 |
| JP | 2007-122885 | 5/2007 |
| JP | 2009249665 A | 10/2009 |

* cited by examiner

30mm

20mm

30mm

METHOD FOR RECOVERING VALUABLE MATERIAL FROM LITHIUM-ION SECONDARY BATTERY, AND RECOVERED MATERIAL CONTAINING VALUABLE MATERIAL

CROSS-REFERENCE TO RELATED APPLICATION

This is a continuation application of PCT/JP2011/078153, filed on Dec. 6, 2011.

BACKGROUND OF THE INVENTION

1. Field of the Invention

The present invention relates to a method for recovering a valuable material from a lithium-ion secondary battery, which is capable of recovering valuable materials, such as cobalt, from defective lithium-ion secondary batteries generated in a production process, lithium-ion secondary batteries, which have been discarded because of end of service life of devices using the batteries or the batteries, and relates to a recovered material obtained by the method for recovering a valuable material from a lithium-ion secondary battery.

2. Description of the Related Art

Lithium-ion secondary batteries have light weight, high volume, and high light in weight, high in volume, and high electromotive force compared to conventional lead storage batteries, or NiCad secondary batteries, and thus are used as a secondary battery for personal computers, electric vehicles, or mobile phones. In a positive electrode of a lithium-ion secondary battery, a valuable material, such as cobalt and nickel, is used as lithium cobalt oxide ($LiCoO_2$), or a ternary positive electrode material ($LiNi_xCo_yMn_zO_{2(x+y+z)}$.

Use of lithium-ion secondary batteries is expected to increase in the future. Therefore, it is desired in view of recycling of resources that a valuable material, such as cobalt, is recovered from a defective products generated during production, or lithium-ion secondary batteries discarded due to end of service life of devices using the batteries or the batteries themselves.

When the valuable material is recovered from a lithium-ion secondary battery, it is important that various metals used in the battery are separated and recovered for enhancing a value of a recovered material. Especially, it is very important that the valuable material is separated from iron or the like, and recovered for enhancing a value of a recovered material containing the valuable material.

As for a recovering method for a valuable material, proposed is a method containing; primary roasting a waste lithium secondary battery at temperature of 350° C. or higher; breaking the battery by a shear breaker; sieving the broken product; secondary roasting the undersize particles; treating the roasted particles with acid; adjusting pH of the process liquid to 4 to 5.5 with blowing oxidizing gas into the process liquid, and filtering the process liquid; adding alkali to the filtrate; and further filtering and recovering sedimentary deposits (see Japanese Patent Application Laid-Open (JP-A) No. 07-207349.

Moreover, proposed is a method for recovering cobalt, which contains; roasting a waste lithium secondary battery at temperature of 350° C. or higher; breaking the roasted battery by a shear breaker; sieving the broken product; and subjecting the undersize particles to magnetic sorting (see JP-A No. 07-245126).

In these proposed techniques, however, in the breaking step, the batteries are not broken into the level where a valuable material, such as cobalt, can be sufficiently separated from other metal, such as iron, used for a battery case (housing) at the time of a sieve sorting step, which is a following step. Therefore, a valuable material, such as cobalt, is also remained in the oversize particles after being sieved and sorted. As a result, there is a problem that a recovery rate of a valuable material in a recovered material obtained from the undersize particles is low. Since iron or the like is included in the oversize particles, it is not economical to recover a valuable material from the oversize particles, as many steps are required for recovering the valuable material. In the case where a shear breaker is used, moreover, an iron powder having small particle diameters is generated, and mixed into a recovered material of undersize particles. Since iron and cobalt are both attracted to a magnet, iron is also recovered with cobalt when cobalt is magnetic sorted after the sieve sorting. Therefore, there is a problem that iron is mixed into a recovered material as impurities.

When breaking or sieve sorting is performed by a dry process, moreover, powder dusts, mainly formed of carbon of a negative electrode, are generated, and there is a danger of explosion, which is a problem.

Moreover, proposed is a method containing: decomposing a lithium-ion secondary battery without roasting, followed by separating by means of a ball mill using alcohol (see JP-A No. 2007-122885). In this proposed technique, however, there is a problem that a few separating steps are required, or a problem that iron, which is a metal of a battery case (housing) is crushed, and mixed with a valuable material contained an electrode, so that a large amount of iron is mixed into a recovered material as impurities.

Accordingly, there are currently needs for a method for recovering a valuable material, which can recover a valuable material, such as cobalt, from a lithium-ion secondary battery at a high recovery rate, gives a less contamination amount of impurities, such as iron, to a recovered material containing a valuable material, and has simple steps.

SUMMARY OF THE INVENTION

The present invention aims to solve the aforementioned various problems in the art, and achieve the following object. Namely, an object of the present invention is to provide a method for recovering a valuable material, which can recover a valuable material, such as cobalt, from a lithium-ion secondary battery at a high recovery rate, gives a less contamination amount of impurities, such as iron, to a recovered material containing a valuable material, and has simple steps.

The means for solving the aforementioned problems are as follows.

A method for recovering a valuable material from a lithium-ion secondary battery according to the present invention, containing:

roasting a lithium-ion secondary battery containing a valuable material in a metal battery case thereof to obtain a roasted material;

stirring the roasted material with liquid to separate contents containing the valuable material from the inside of the metal battery case; and sorting the contents separated by the separation and the metal battery case to obtain a recovered material containing the valuable material.

The present invention can solve the aforementioned various problems in the art, and can provide a method for recovering a valuable material, which can recover a valuable material, such as cobalt, from a lithium-ion secondary battery at a high recovery rate, gives a less contamination amount of impurities, such as iron, to a recovered material containing a valuable material, and has simple steps.

DETAILED DESCRIPTION OF THE INVENTION

Figure 1:
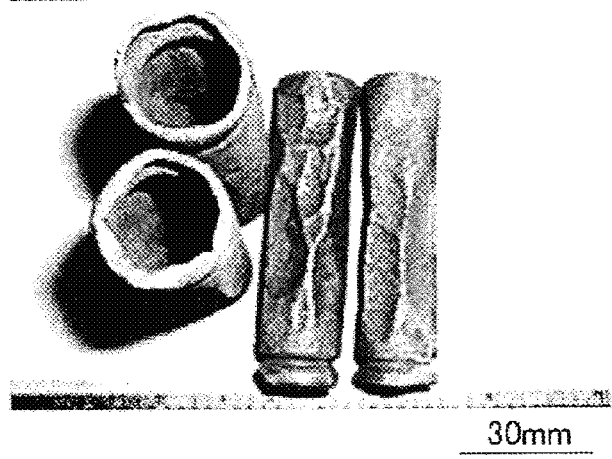
FIG. 1 is a photograph of the metal battery case after the separating step in Example 1.

Method for Recovering Valuable Material from Lithium-Ion Secondary Battery and Recovered Material Containing Valuable Material The method for recovering a valuable material from a lithium-ion secondary battery of the present invention contains at least a roasting step, a separating step, and a sorting step in this order, and may further contain other steps, if necessary.

The recovered material containing a valuable material of the present invention is obtained by the method for recovering a valuable material from a lithium-ion secondary battery of the present invention.

<Roasting Step>

The roasting step is appropriately selected depending on the intended purpose without any limitation, provided that it is roasting a lithium-ion secondary battery to obtain a roasted material.

—Lithium-Ion Secondary Battery—

The lithium-ion secondary battery is appropriately selected depending on the intended purpose without any limitation, provided that it is a lithium-ion secondary battery containing a metal battery case, and a valuable material in the metal battery case. Examples thereof include a defective lithium-ion secondary battery generated during production of lithium-ion secondary batteries, a lithium-ion secondary battery discarded due to failure of a device using the lithium-ion secondary battery or end of the service life of the device, and a used lithium-ion secondary battery discarded because of end of its service life.

As for the lithium-ion secondary battery, for example, a lithium-ion secondary battery containing a positive electrode, a negative electrode, a separator, an electrolytic solution containing an electrolyte and an organic solvent, and a metal battery case housing the positive electrode, the negative electrode, the separator, and the electrolytic solution is listed.

The metal battery case is appropriately selected depending on the intended purpose without any limitation, and examples thereof include an iron battery case. The iron battery case may contain metal other than the iron, e.g., nickel, or may be an alloy.

The positive electrode is appropriately selected depending on the intended purpose without any limitation, and examples thereof include a positive electrode containing a collector formed of aluminum foil, and a positive electrode material provided on the collector.

The positive electrode material is appropriately selected depending on the intended purpose without any limitation, provided that it contains a valuable material, and examples thereof include a positive electrode material, which contains at least multiple oxide containing a valuable material, and optionally contains a conductant agent, and a binder resin.

Examples of the valuable material include cobalt, and nickel.

Examples of the multiple oxide include lithium cobalt oxide ($LiCoO_2$), lithium cobalt nickel oxide ($LiCo_{1/2}Ni_{1/2}O_2$), and $LiNi_xCo_yMn_zO_{2(x+y+z)}$.

A shape of the lithium-ion secondary battery is appropriately selected depending on the intended purpose without any limitation, and examples thereof include a cylindrical shape, a button shape, a coin shape, a square shape, and a flat shape.

—Roasting—

As a result of the roasting, the collector (e.g., aluminum foil), to which the positive electrode material containing the valuable material has been deposited, is melted, or the like, so that the positive electrode material is easily separated. Moreover, organic materials in the contents of the lithium-ion secondary battery, e.g., an electrolyte, are burned so that the pressure (internal pressure) inside the lithium-ion secondary battery becomes high and a safety valve of the metal battery case is released. As a result, it becomes easy to separate the contents containing valuable material from the inside of the metal battery case in the separating step. Accordingly, the contents containing the valuable material can be easily separated from the inside of the metal battery case by stirring performed in the following step, i.e., the separating step. Moreover, after separating the positive electrode material from the collector, the positive electrode material can be easily turned into a fine material, and therefore the positive electrode material containing the valuable material, and iron, such as of the collector or the battery case can be highly precisely sorted by a sieve or the like.

Roasting temperature of the roasting is appropriately selected depending on the intended purpose without any limitation, but it is preferably 400° C. or higher, more preferably 650° C. to 800° C. When the roasting temperature is lower than 400° C., it is hard to melt the collector, and thus a recovery rate of the valuable material may be low. When the roasting temperature is higher than 800° C., materials constituting the battery case are also melted, and thus the intended valuable material may not be recovered.

Here, the roasting temperature means temperature of the lithium-ion secondary battery at the time of the roasting. The roasting temperature can be measured by inserting a thermometer, such as a thermocouple, and a thermistor, in the lithium-ion secondary battery during the roasting.

Roasting time of the roasting is appropriately selected depending on the intended purpose without any limitation, but it is preferably 1 minute to 5 hours, more preferably 1 minute to 2 hours, and particularly preferably 1 minute to 1 hour. The roasting time is not limited as long as it is roasting time until the collector and the positive electrode material reach the predetermined temperature, and retention time may be shorter than such time. When the roasting time is in the aforementioned particularly preferable range, it is advantageous in view of a cost required for the roasting.

A method of the roasting is appropriately selected depending on the intended purpose without any limitation, and examples thereof include a method in which the roasting is performed using a roasting furnace. Examples of the roasting furnace include a rotary kiln, a fluid bed furnace, a tunnel furnace, a batch-type furnace (e.g., a muffle furnace), a cupola furnace, and a stoker fired furnace.

The roasting atmosphere is appropriately selected depending on the intended purpose without any limitation, and examples thereof include an atmospheric air atmosphere, an oxidizing atmosphere, an inert atmosphere, and a reducing atmosphere. Note that, it is preferred that the roasting furnace be ventilated during the roasting Here, the atmospheric air atmosphere (air atmosphere) means an atmosphere using the atmospheric air (air) containing 21% of oxygen and 78% of nitrogen.

The oxidizing atmosphere means an atmosphere containing 1% by mass to 21% by mass of oxygen in the inert atmosphere, preferably an atmosphere containing 1% by mass to 5% by mass of oxygen.

The inert atmosphere means an atmosphere consisting of an inert gas, such as nitrogen, and argon.

As for the reducing atmosphere, for example, an atmosphere containing CO, $H_2$, $H_2S$, $SO_2$ or the like in the inert atmosphere is listed.

Among them, the atmospheric air atmosphere (air atmosphere) is preferable, as it is easy to control the atmosphere inside the furnace.

<Separating Step>

The separating step is appropriately selected depending on the intended purpose without any limitation, provided that it is stirring the roasted material with liquid to separate contents containing the valuable material from the inside of the metal battery case.

As a result of the roasting step, most of the contents inside the metal battery case of the lithium-ion secondary battery have become fine, and brittle, and have been easily broken down. Therefore, the contents containing the valuable material can be easily separated from the inside of the metal battery case by stirring the roasted material with a liquid in the separating step.

As a result of the separating step, for example, the contents containing the valuable material are pulled out from the inside of the metal battery case.

—Stirring—

The stirring is appropriately selected depending on the intended purpose without any limitation.

Here, the stirring is performed so as not to break or crush the metal battery case. This is because it is difficult to separate metal, such as iron, that is a material of the battery case, from the valuable material for recovery, if the metal battery case is broken or crushed. Note that, there is no problem that the metal battery case is dented to some extent by the stirring.

Moreover, even though a safety valve of the metal battery case is not released in the roasting step, the safety valve can be released by impacts caused during the stirring.

A method of the stirring is appropriately selected depending on the intended purpose without any limitation, but the stirring is preferably performed by a ball mill, a rod mill, a mill without using solid media, or a rotary washing machine.

Here, in the case where the stirring is performed by a mill using solid media, the metal battery case may be broken or crushed, or the metal battery case may be deformed into a plate shape. Therefore, solid media is not generally used for the stirring. In the case where solid media is used, the stirring is preferably performed under the conditions with which the metal battery case is not broken, or crushed, or deformed into a plate shape.

The liquid is appropriately selected depending on the intended purpose without any limitation, and examples thereof include water, and an organic solvent.

Examples of the water include acidic water, neutral water, and alkaline water.

Examples of the organic solvent include an alcohol-based solvent, a glycol-based solvent, and a glycol ether-based solvent. Examples of the alcohol-based solvent include methanol, ethanol, propanol, isopropanol, butanol, 2-butanol, and tert-butanol. Examples of the glycol-based solvent include ethylene glycol, diethylene glycol, propylene glycol, and dipropylene glycol. Examples of the glycol ether-based solvent include ethylene glycol methyl ether, propylene glycol methyl ether, diethylene glycol methyl ether, diethylene glycol ethyl ether, diethylene glycol propyl ether, diethylene glycol butyl ether, dipropylene glycol methyl ether, dipropylene glycol ethyl ether, dipropylene glycol propyl ether, dipropylene glycol butyl ether, triethylene glycol methyl ether, triethylene glycol ethyl ether, triethylene glycol propyl ether, triethylene glycol butyl ether, tripropylene glycol methyl ether, tripropylene glycol ethyl ether, tripropylene glycol propyl ether, and tripropylene glycol butyl ether.

An amount of the liquid for use is appropriately selected depending on the intended purpose without any limitation, but it is preferably 0.5 kg to 100 kg, more preferably 1 kg to 5 kg, relative to 1 kg of the roasted material. When the amount thereof is less than 0.5 kg, the liquid, such as water, does not sufficiently spread, and thus contents containing the valuable material may not be desirably separated from the inside of the metal battery case. When the amount thereof is greater than 100 kg, it may be difficult to process a liquid after the solid-liquid separation.

Stirring time of the stirring is appropriately selected depending on the intended purpose without any limitation, but it is preferably 1 minute to 5 hours, more preferably 5 minutes to 3 hours, and particularly preferably 10 minutes to 2 hours. When the stirring time is shorter than 1 minute, separation is performed insufficiently, and thus a recovery rate of the valuable material may be low. When the stirring time is longer than 5 hours, it may be difficult to separate in the sorting step due to over crushing, or a concentration of impurities in a recovered material may be increase as the metal battery case is scraped by frictions.

There is an advantage for performing the separating step with the liquid, i.e., performing the separating step in a wet system, and such advantage is to prevent a dust explosion caused by carbon contained in the roasted material. There is also an advantage that the contents containing the valuable material can be efficiently separated from the inside of the metal battery case.

Here, a photograph of the metal battery case after the separating step is depicted in FIG. 1. A safety valve is released from the metal battery case, and the metal battery case is dented to some extent but not broken or crushed. Moreover, the contents inside the metal battery case are separated by the separating step.

<Sorting Step>

The sorting step is appropriately selected depending on the intended purpose without any limitation, provided that it is sorting the contents and the metal battery case separated by the separating step to obtain a recovered material containing the valuable material, but the sorting step is preferably performed by sieving as a device for use is simple, and operation thereof is simple.

—Sieving—

The sieving is appropriately selected depending on the intended purpose without any limitation, and for example, the sieving can be performed by means of a vibrating sieve, a multi-stage vibrating sieve, a cyclone, or a standard sieve of JIS Z8801.

An opening size of a mesh of the sieve is appropriately selected depending on the intended purpose without any limitation, but it is preferably 0.025 mm to 2 mm, more preferably 0.025 mm to 1.5 mm, and particularly preferably 0.075 mm to 1 mm. When the opening size of the mesh is smaller than 0.025 mm, a recovery rate of the valuable material from the undersize particles may be low. When the opening size of the mesh is greater than 2 mm, iron dusts or the like are mixed and included in undersize particles, and therefore a further step of sorting may be required. When the opening size of the mesh is within the aforementioned particularly preferable range, it is advantageous as a recovery rate of the valuable material improves.

The sieving may be a dry process, or a wet process. Among them, the wet system is preferable, as the contents obtained by the separating step can be subjected to the sieving without separating from the liquid, and therefore a step is simplified, and generation of powder dusts can be prevented.

The oversize particles after the sieving contain mainly iron and aluminum in the form of the battery case, and the aluminum foil, and the undersize particles mainly contain the positive electrode material.

The sieving is typically carried out with shaking the sieve, in other words, with applying vibrations to the sieve. Therefore, for example, even in the case where the valuable material (e.g., cobalt) is remained inside of the battery case, or the valuable material (e.g., cobalt) is wrapped with the aluminum foil, the valuable material (e.g., cobalt) can be separated from the battery case or the aluminum foil by the vibrations. Accordingly, the positive electrode material finely crushed in the separating step is sorted into undersize particles at high efficiency.

In the sieving, the undersize particles may be further subjected to sieving.

Here, in the case where the undersize particles are further subjected to sieving in the sieving, oversize particles attained from the first sieving are referred to as first oversize particles and the undersize particles attained from the first sieving are referred to as first undersize particles, the oversize particles attained by sieving the first undersize particles are referred to as second oversize particles and the undersize particles attained by sieving the first undersize particles are referred to as second undersize particles.

By further sieving the first undersize particles, carbon, which is a material of the negative electrode, is moved to the second undersize particles, to separate the carbon from the recovered material containing the valuable material remained in the second oversize particles.

In the case where the first undersize particles are further sieved, a multi-stage sieve can be used for the sieving. Moreover, the first oversize particles and the second oversize particles can be sieved again.

When the first undersize particles are further sieved, an opening size of a mesh of a sieve is appropriately selected depending on the intended purpose without any limitation, but it is preferably 0.0075 mm to 0.3 mm, more preferably 0.025 mm to 0.15 mm, and particularly preferably 0.025 mm to 0.075 mm. When the opening size of the mesh is smaller than 0.0075 mm, a particle size is too small so that it may be difficult to sort. When the opening size of the mesh is greater than 0.3 mm, a recovery rate of the valuable material may be low. When the opening size of the mesh is within the aforementioned particularly preferable range, it is advantageous because an amount of the valuable material lost when the undersize particles are removed can be reduced as much as possible.

A particle size of the recovered material of the undersize particle (the first undersize particles) obtained by the sieving is appropriately selected depending on the intended purpose without any limitation, but it is preferably 1 mm or smaller, in view of a high recovery rate of cobalt and a low amount of other impurities. Examples of a method for adjusting the particle size to 1 mm include a method in which sieving is performed with a sieve having an opening size of 1 mm.

The method for recovering a valuable material from a lithium-ion secondary battery does not need to carry out a secondary roasting step or magnetic sorting step after the sorting step, has simple steps, and can recover a valuable material, such as cobalt, at a high recovery rate.

EXAMPLES

Examples of the present invention will be explained hereinafter, but Examples shall not be construed as to limit a scope of the present invention.

Example 1

As for a lithium-ion secondary battery, a waste lithium-ion secondary battery for a personal computer was used.
—Roasting Step—
Into a muffle furnace (FJ-41, manufactured by Yamato Scientific Co., Ltd.), the lithium-ion secondary battery was placed. Roasting temperature was set to 800° C., and temperature was increased up to 800° C. at a heating rate of 10° C./min. After the temperature reached 800° C., the lithium-ion secondary battery was roasted for 1 hour to thereby obtain a roasted material. The internal atmosphere of the furnace was an air atmosphere.
—Separating Step—
The roasting material (8 kg) obtained by the roasting step and water (30 L) were placed in a ball mill (volume: 220 L) in which there was no solid media inside, and the roasting material and the water were stirred for 2.5 hours at a rotating speed of 50 rpm to pull out contents containing a valuable material, which had been present inside a metal battery case, from the metal battery case of the lithium-ion secondary battery.
—Sorting Step—
Coarse particles in water and the metal battery case in water, which had been separated by the separating step, were each sieved through a sieve having an opening size of 1.00 mm.
<Evaluation>
After the sieving, oversize particles and undersize particles were dried to remove the moisture.

After the drying, a mass of the oversize particles and a mass of the undersize particles were each measured, and a mass ratio of the oversize particles relative to the battery and a mass ratio of the undersize particles relative to the battery were determined.

Moreover, the oversize particles and undersize particles (recovered material) after being dried were each heated and dissolved in aqua regia, and a resultant was subjected to analysis by a high frequency inductively coupled plasma-atomic emission spectrometry (iCaP6300, manufactured by Thermo Fisher Scientific Inc.), to thereby determine a recovery rate of cobalt, a contamination rate of iron as impurities, a metal content in the oversize particles, and a metal content in the undersize particles.

The results are presented in Table 1.

Comparative Example 1

A valuable material was recovered and evaluated in the same manner as in Example 1, provided instead of the separating step, the roasted material (8 kg) was broken for 10 seconds by a shearing breaker, Good Cutter (UG-102-10-240, manufactured by Ujiie Manufacturing Co., Ltd., width of tooth: 10 mm). The results are presented in Table 1. Note that, drying after the sieving was not performed, as the breaking was performed by a dry process.

Comparative Example 2

A valuable material was recovered and evaluated in the same manner as in Example 1, provided that 180 kg of iron media (iron balls having diameters of 30 mm to 70 mm) was placed in the ball mill. The results are presented in Table 1.

TABLE 1

| Comparing item | | Unit | Example 1 | Comparative Example 1 | Comparative Example 2 |
|---|---|---|---|---|---|
| Processing device | | — | Ball mill (wet system) with no solid media | Shear breaker (Good Cutter) | Ball mill (wet system) with solid media |
| Roasting temperature | | °C. | 800 | 800 | 800 |
| Recovery rate of Co in recovered material of undersize particles | | % | 99.2 | 76.7 | 99.2 |
| Contamination rate of iron to recovered material | | % | 7.0 | 10.3 | 28.8 |
| Mass ratio of oversize particles to battery | | Mass % | 35.1 | 42.0 | 23.5 |
| Mass ratio of undersize particles to battery | | Mass % | 64.9 | 58.0 | 76.5 |
| Metal content in oversize particles | Co | Mass % | 0.17 | 4.57 | 0.26 |
|  | Fe | Mass % | 77.32 | 54.79 | 80.80 |
| Metal content in undersize particles | Co | Mass % | 11.31 | 10.89 | 9.24 |
|  | Fe | Mass % | 3.14 | 4.54 | 10.05 |

In Table 1, the recovery rate of cobalt (Co) is a recovery rate when an amount of cobalt contained in the lithium-ion secondary battery used for Example and Comparative Examples is determined as 100%. The contamination rate of iron is a contamination rate when a total amount of iron before passing through the sieve is determined as 100%. The metal content in the oversize particles is a sum of an amount of the cobalt and an amount of the iron relative to a total amount of the oversize particles. The metal content in the undersize particles is a sum of an amount of the cobalt and an amount of the iron relative to a total amount of the undersize particles.

As depicted in Table 1, in each of Comparative Examples 1 and 2, the iron battery case was crushed, and the iron was mixed into the recovered material of the under particles passed through the sieve having the opening size of 1.00 mm. As a result, 10.3% of iron was passed through the sieve having the opening size of 1.00 mm in Comparative Example 1, and 28.8% of iron was passed through the sieve having the opening size of 1.00 mm, where a total amount of the iron before passed through the sieve was determined 100%. This resulted that iron was mixed, as impurities, into the recovered material containing the valuable material, such as cobalt. Note that, iron and cobalt are both materials attracted to a magnet. In the case where magnetic sorting is performed for recovering cobalt, iron and cobalt are both attracted to a magnet and recovered, and thus it is difficult to separate cobalt from iron.

In contrast, in Example 1, a contamination rate of iron in the recovered material containing the valuable material was very low, i.e., 7.0%, and the result was excellent.

Moreover, it was found from comparison between mass of the oversize particles and mass of the undersize particles that a proportion of the oversize particles was higher in Comparative Example 1 than that in Example 1 and cobalt was remained in the oversize particles. Moreover, it was found that a proportion of the undersize particles was high in Comparative Example 2 compared to Example 1, and the breaking was excessive, and therefore the broken material having the fine particle size increased.

From these results, in Example 1, cobalt, which was one of the contents of the lithium-ion secondary battery, could be recovered in the state where an amount of iron, which mainly became impurities, was small, without excessively crushed.

Figure 2:
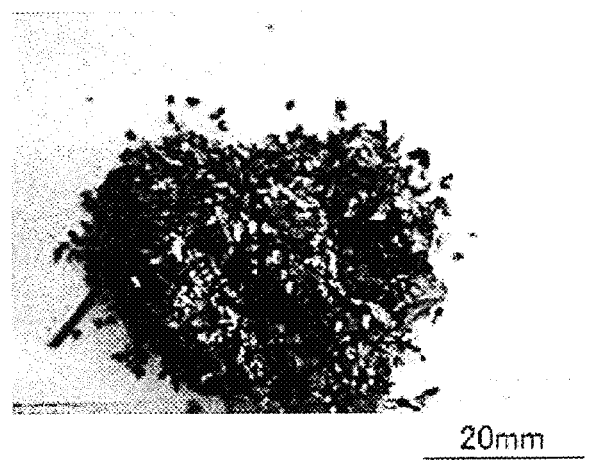
FIG. 2 is a photograph of the roasted material after breaking in Comparative Example 1.
Figure 3:
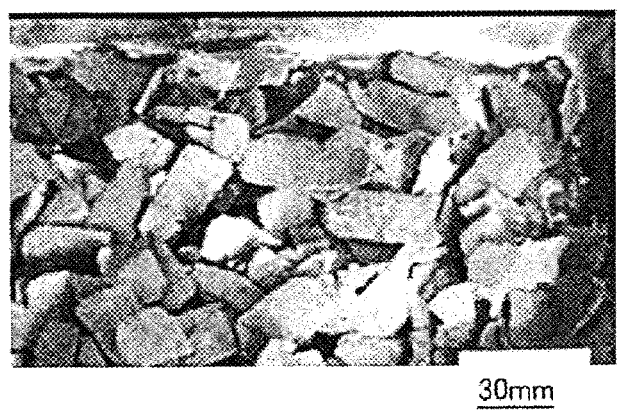
FIG. 3 is a photograph of a mixture of the metal battery case, and contents after the separating step in Comparative Example 2.

Note that, FIG. 1 depicts a photograph of the metal battery case after the separating step in Example 1. Moreover, FIG. 2 depicts a photograph of the roasted material after the breaking in Comparative Example 1. Further, FIG. 3 depicts a photograph of a mixture of the metal battery case, and the contents after the separating step in Comparative Example 2. In Example 1, the metal battery case was not broken or crushed, even through it was slightly dented, and the contents were pulled out from the metal battery case. On the other hand, in Comparative Examples 1 and 2, the metal battery case was broken or crushed, and resulted as a fine broken material or crushed material.

Embodiments of the present invention include, for example, the following embodiments:

<1> A method for recovering a valuable material from a lithium-ion secondary battery, the method containing:
roasting a lithium-ion secondary battery containing a valuable material in a metal battery case thereof to obtain a roasted material;
stirring the roasted material with liquid to separate contents containing the valuable material from the inside of the metal battery case; and
sorting the contents separated by the separation and the metal battery case to obtain a recovered material containing the valuable material.

<2> The method for recovering a valuable material from a lithium-ion secondary battery according to <1>, wherein the valuable material is cobalt.

<3> The method for recovering a valuable material from a lithium-ion secondary battery according to <1> or <2>, wherein the separation is performed by a ball mill, a rod mill, a mill using no solid media, and a rotary washing machine.

<4> The method for recovering a valuable material from a lithium-ion secondary battery according to any one of <1> to <3>, wherein an amount of the liquid for use in the separation is 0.5 kg to 100 kg relative to 1 kg of the roasted material.

<5> The method for recovering a valuable material from a lithium-ion secondary battery according to any one of <1> to <4>, wherein the sorting is performed by sieving.

<6> The method for recovering a valuable material from a lithium-ion secondary battery according to <5>, wherein a particle size of undersize recovered material obtained by the sieving is 1 mm or smaller.

<7> A recovered material, containing:
a valuable material,
wherein the recovered material is obtained by the method for recovering a valuable material from a lithium-ion secondary battery according any one of <1> to <6>.

INDUSTRIAL APPLICABILITY

The method for recovering a valuable material from a lithium-ion secondary battery of the present invention is suitably used for recovery of a valuable material from a lithium-ion secondary battery, as a valuable material, such as cobalt, can be recovered from a lithium-ion secondary battery at a high recovery rate, a contamination amount of iron to a recovered material containing a valuable material is small, and moreover steps thereof are simple.

What is claimed is:

1. A method for recovering a valuable material from a lithium-ion secondary battery, the method comprising:
   roasting a lithium-ion secondary battery containing a valuable material in a metal battery case thereof to obtain a roasted material;
   stirring the roasted material with liquid to separate contents containing the valuable material from the inside of the metal battery case, wherein the stirring is performed so as not to break or crush the metal battery case; and
   sorting the contents separated by the separation and the metal battery case to obtain a recovered material containing the valuable material.

2. The method for recovering a valuable material from a lithium-ion secondary battery according to claim 1, wherein the valuable material is cobalt.

3. The method for recovering a valuable material from a lithium-ion secondary battery according to claim 1, wherein the separation is performed by a ball mill, a rod mill, a mill using no solid media, and a rotary washing machine.

4. The method for recovering a valuable material from a lithium-ion secondary battery according to claim 1, wherein an amount of the liquid for use in the separation is 0.5 kg to 100 kg relative to 1 kg of the roasted material.

5. The method for recovering a valuable material from a lithium-ion secondary battery according to claim 1, wherein the sorting is performed by sieving.

6. The method for recovering a valuable material from a lithium-ion secondary battery according to claim 5, wherein a particle size of undersize recovered material obtained by the sieving is 1 mm or smaller.

* * * * *